US012666180B2

(12) United States Patent
Toyoshima et al.

(10) Patent No.: US 12,666,180 B2
(45) Date of Patent: Jun. 23, 2026

(54) COMMUNICATION SYSTEM, TRANSMITTER, RECEIVER AND COMMUNICATION METHOD

(71) Applicant: NTT, Inc., Tokyo (JP)

(72) Inventors: Yukio Toyoshima, Musashino (JP); Keita Nishimoto, Musashino (JP)

(73) Assignee: NTT, Inc., Tokyo (JP)

( * ) Notice: Subject to any disclaimer, the term of this patent is extended or adjusted under 35 U.S.C. 154(b) by 772 days.

(21) Appl. No.: 18/024,877

(22) PCT Filed: Sep. 11, 2020

(86) PCT No.: PCT/JP2020/034428
§ 371 (c)(1),
(2) Date: Mar. 6, 2023

(87) PCT Pub. No.: WO2022/054222
PCT Pub. Date: Mar. 17, 2022

(65) Prior Publication Data
US 2023/0319441 A1     Oct. 5, 2023

(51) Int. Cl.
*H04Q 11/00*          (2006.01)
(52) U.S. Cl.
CPC ..... *H04Q 11/0005* (2013.01); *H04Q 11/0067* (2013.01)
(58) Field of Classification Search
CPC ........................ H04Q 11/0005; H04Q 11/0067
See application file for complete search history.

(56) References Cited

FOREIGN PATENT DOCUMENTS

WO      WO-2004017666 A2 *   2/2004   ......... H04Q 11/0005

OTHER PUBLICATIONS

"Cascading connection, multistage connection", IT term dictionary, e-Words, Update Date: Jan. 27, 2020 [searched on Aug. 19, 2020], Internet <URL: http://e-words.jp/w/CascadingConnection.html#:~:text=>.

* cited by examiner

*Primary Examiner* — Chad H Smith
(74) *Attorney, Agent, or Firm* — Harness, Dickey & Pierce, P.L.C.

(57)          ABSTRACT

A signals is input to k (k being an integer 2 or greater) switching units, and is output to one of n (n being an integer of 2 or greater) output ports. The n×k splitter units each corresponding to the respective output ports of the respective switching units split the signals having been output from the corresponding output ports into $n^{k-1}$ signals. A plurality of receivers are connected to the k splitter units that split signals having been output from the k respective switching units. The combinations of the splitter units to which the respective receivers are connected are different. A receiver accepts received signals when having received the signals from all of the connected k splitter units, but discards received signals when having received the signals from only a part of the connected k splitter units. A control unit controls the output ports to which the respective switching units output signals in accordance with the receiver serving as the destination of data.

8 Claims, 6 Drawing Sheets

COMMUNICATION SYSTEM, TRANSMITTER, RECEIVER AND COMMUNICATION METHOD

CROSS-REFERENCE TO RELATED APPLICATIONS

This application is a 371 U.S. National Phase of International Application No. PCT/JP2020/034428, filed on Sep. 11, 2020. The entire disclosure of the above application is incorporated herein by reference.

TECHNICAL FIELD

The present invention relates to a communication system, a transmitter, a receiver and a communication method.

BACKGROUND ART

A switch is used for a plurality of terminals or devices connected to a network to dynamically change destinations and transmit/receive data. FIGS. 6 and 7 are diagrams illustrating examples of conventional switches. In FIG. 6, a control unit controls one 1×n switch to have n destinations. In FIG. 7, a control unit controls one 1×k switch and k 1×n switches to have k×n destinations.

CITATION LIST

Non Patent Literature

Non Patent Literature 1: "cascading connection, multistage connection", IT term dictionary, e-Words, [searched on Aug. 19, 2020], Internet <URL: http://e-words.jp/w/CascadingConnection.html#:~:text=>

SUMMARY OF INVENTION

Technical Problem

In a case where the number m of destinations to which data can be transmitted is larger than the number n of output ports of a switch, the switch illustrated in FIG. 6 is not applicable. Furthermore, to obtain the number m of destinations in the configuration illustrated in FIG. 7, k 1×n switches are necessary, k being the smallest integer satisfying k>m/n. Therefore, the number of devices is large.

In view of the above circumstances, the present invention aims to provide a communication system, a transmitter, a receiver and a communication method that enable transmission of data to destinations without an increase in the number of devices even in a case where the number of destinations is large.

Solution to Problem

One aspects of the present invention is a communication system that includes: k (k being an integer greater than or equal to 2) switching units (hereinafter also referred to as "switches") each receiving a signal, and outputting the signal to one of n (n being an integer greater than or equal to 2) output ports; n×k splitter units (hereinafter also referred to as "splitters") each corresponding to respective one of the n output ports of the k switching units, and splitting the signal having been output from the respective one of the output ports into $n^{k-1}$ signals; a plurality of receivers each connected to k splitter units out of the n×k splitter units that split the signal having been output from respective one of the k switching units, wherein each of the receivers accepts received signals when having received the signals from all of the connected k splitter units, and discards at least one of the received signals when having received at least one signal from a part of the connected k splitter units; and a control unit (hereinafter also referred to as "controller") that controls one of the output port of the k switching units to output the signal in accordance with which receiver out of the plurality of receivers is a destination, the plurality of receivers being connected to different combinations of the k splitter units from each other.

One aspect of the present invention is a transmitter that includes: k (k being an integer greater than or equal to 2) switching units each receiving a signal, and outputting the signal to one of n (n being an integer greater than or equal to 2) output ports; n×k splitter units each corresponding to respective one of the n output ports of the k switching units, and splitting the signal having been output from the respective one of the output ports into $n^{k-1}$ signals; and a control unit that controls one of the output ports of the k switching units to output the signal in accordance with which receiver out of a plurality of receivers is a destination, each of the plurality of receivers being connected to k splitter units out of the n×k splitter units that split the signals having been output from the k respective switching units and the plurality of receivers being connected to different combinations of the k splitter units.

One aspect of the present invention is a receiver that is connected to k (k being an integer greater than or equal to 2) splitter units out of n×k splitter units corresponding to respective one of n (n being an integer greater than or equal to 2) output ports of k switching units each receiving a signal and outputting the signal to one of the n output ports, the n×k splitter units splitting the signal having been output from the respective one of the output ports into $n^{k-1}$ signals, the receiver being connected to the k splitter units out of the n×k splitter units that split the signal having been output from the k respective switching units. The receiver includes a reception unit (hereinafter also referred to as "signal receiver") that accepts received signals when having received the signals from all of the connected k splitter units, and discards at least one of the received signal when having received at least one signal from a part of the connected k splitter units. The combination of the k splitter units connected to the receiver is different from a combination of the k splitter units connected to another receiver.

One aspect of the present invention is a communication method that includes: a switching step in which each of k (k being an integer greater than or equal to 2) switching units receives a signal, and outputs the signal to one of n (n being an integer greater than or equal to 2) output ports; a splitting step in which n×k splitter units each corresponding to respective one of the n output ports of the k switching units, split the signal having been output from the respective one of the corresponding output ports into $n^{k-1}$ signals; a receiving step in which a plurality of receivers each connected to k splitter units which split the signals having been output from respective one of the k switching units in different combinations of the k splitter units from each other, accept received signals when having received the signals from all of the connected k splitter units, and discard at least one of the received signal when having received at least one signal from a part of the connected k splitter units; and a control step of controlling one of the output ports of the k switching units to output the signal in accordance with which receiver out of the plurality of receivers is a destination.

Advantageous Effects of Invention

According to the present invention, it is possible to transmit data to destinations without an increase in the number of devices even in a case where the number of destinations is large.

BRIEF DESCRIPTION OF DRAWINGS

FIG. 3 is a diagram illustrating a communication system according to a third embodiment.

FIG. 4 is a diagram illustrating a communication system according to a fourth embodiment.

DESCRIPTION OF EMBODIMENTS

In the description below, embodiments of the present invention will be explained in detail, with reference to the drawings.

First Embodiment

Figure 1:
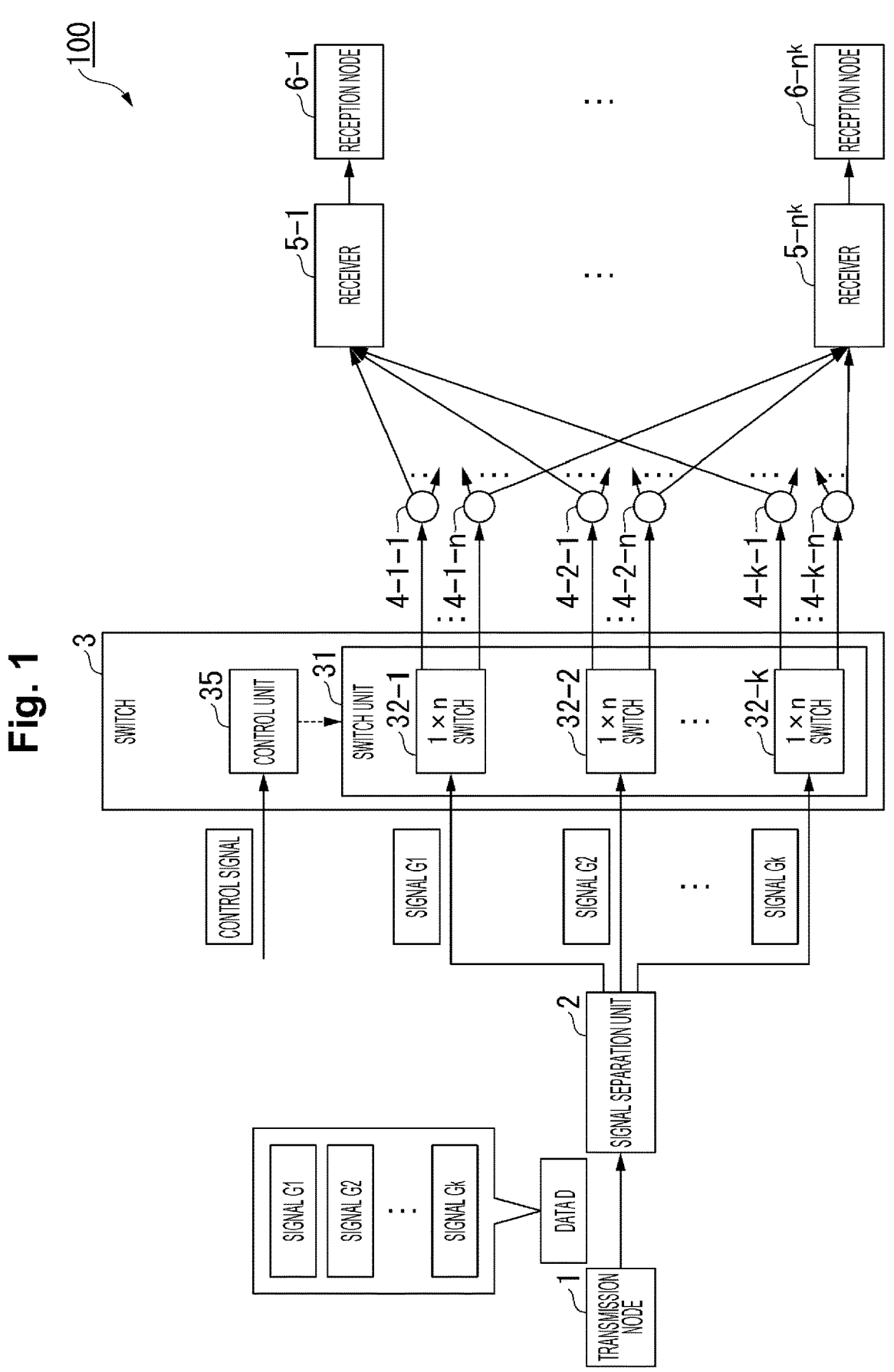
FIG. 1 is a diagram illustrating a communication system according to a first embodiment.

FIG. 1 is a configuration diagram of a communication system 100 according to a first embodiment of the present invention. The communication system 100 includes a transmission node 1, a signal separation unit 2 (hereinafter also referred to as "signal separator"), a switch 3, $n \times k$ $n^{k-1}$ branch splitters 4, $n^k$ receivers 5, and $n^k$ reception nodes 6 (k and n being integers of 2 or greater). The $n^k$ receivers 5 are referred to as the receivers 5-1 to 5-$n^k$, respectively, and the $n^k$ reception nodes 6 are referred to as the reception nodes 6-1 to 6-$n^k$, respectively. Note that, although only one transmission node 1 is shown in FIG. 1, the number of transmission nodes 1 may be any appropriate number.

The transmission node 1 transmits data D directed to one of the reception nodes 6. The transmission node 1 can dynamically change the destination reception node 6. The data D includes k signals G. The k signals G are referred to as signals G1 to Gk, respectively. The signal separation unit 2 separates the data D into the signal G1, the signal G2, . . . , and the signal Gk.

The switch 3 includes a switch unit 31 and a control unit 35. The switch unit 31 includes k $1 \times n$ switches 32. A $1 \times n$ switch 32 has one input port and n output ports. The $1 \times n$ switch 32 outputs a signal input through the input port, from one of the n output ports. Hereinafter, the k $1 \times n$ switches 32 will be referred to as the $1 \times n$ switches 32-1 to 32-$k$, respectively. The $1 \times n$ switch 32-$i$ (i being an integer of 1 to k) corresponds to the signal Gi. That is, the $1 \times n$ switch 32-$i$ receives the signal Gi separated by the signal separation unit 2, and outputs the signal Gi from one of the output ports. One output port is connected to one $n^{k-1}$ branch splitter 4.

The control unit 35 controls the switch unit 31 on the basis of an input control signal. Specifically, the control unit 35 controls which output port each of the $1 \times n$ switches 32-1 to 32-$k$ outputs a signal input through the input port.

The respective $n^{k-1}$ branch splitters 4 are connected to different output ports of different $1 \times n$ switches 32. A $n^{k-1}$ branch splitter 4 splits a signal input from an output port of the connected $1 \times n$ switch 32 into $n^{k-1}$ signals, and outputs the split signals. The $n^{k-1}$ branch splitter 4 connected to the jth (j being an integer of 1 to n) output port of the $1 \times n$ switch 32-$i$ is referred to as the $n^{k-1}$ branch splitter 4-$i$-$j$.

A receiver 5 is connected to k $n^{k-1}$ branch splitters 4, which are an $n^{k-1}$ branch splitter 4-1-$j_1$, an $n^{k-1}$ branch splitter 4-2-$j_2$, . . . , and an $n^{k-1}$ branch splitter 4-$k$-$j_k$ (each of $j_1, j_2, \ldots,$ and $j_k$ being an integer of 1 to n). The combination of the $n^{k-1}$ branch splitter 4-1-$j_1$, the $n^{k-1}$ branch splitter 4-2-$j_2$, . . . , and the $n^{k-1}$ branch splitter 4-$k$-$j_k$ to which the receiver 5 is connected is referred to as a connection combination $(j_1, j_2, \ldots,$ and $j_k)$. The connection combinations of the respective receivers 5-1 to 5-$n^k$ differ from one another. As the n $n^{k-1}$ branch splitters 4 are connected to each of the k $1 \times n$ switches 32-1 to 32-$k$, each of $j_1$ to $j_k$ can take n different values. Accordingly, there are $n^k$ connection combinations, and each of the $n^k$ receivers 5 can use a different connection combination. In a case where all of the signals G1 to Gk have been received, the receivers 5 accept the data D including these received signals G1 to Gk. In a case where the receiver 5-$m$ (m being an integer of 1 to $n^k$) has accepted the data D, the accepted data D is output to the reception node 6-$m$. In a case where only some of the signals G1 to Gk have been received, on the other hand, the receivers 5 discard the received signals.

For simplicity, an example of the connection combination in a case where k=2, and n=2 is now described. In this case, the first port of the $1 \times n$ switch 32-1 is connected to the $n^{k-1}$ branch splitter 4-1-1, and the second port is connected to the $n^{k-1}$ branch splitter 4-1-2. The first port of the $1 \times n$ switch 32-2 is connected to the $n^{k-1}$ branch splitter 4-2-1, and the second port is connected to the $n^{k-1}$ branch splitter 4-2-2.

As described above, the connection combination of each of the $n^k = 2^2 = 4$ receivers 5 is different. There can be four connection combinations of (1, 1), (1, 2), (2, 1), and (2, 2). Therefore, the connection combination of the receiver 5-1 is (1, 1), the connection combination of the receiver 5-2 is (1, 2), the connection combination of the receiver 5-3 is (2, 1), and the connection combination of the receiver 5-4 is (2, 2). That is, the $n^{k-1}$ branch splitter 4-1-1 is connected to the receiver 5-1 and the receiver 5-2, the $n^{k-1}$ branch splitter 4-1-2 is connected to the receiver 5-3 and the receiver 5-4, the $n^{k-1}$ branch splitter 4-2-1 is connected to the receiver 5-1 and the receiver 5-3, and the $n^{k-1}$ branch splitter 4-2-2 is connected to the receiver 5-2 and the receiver 5-4.

A reception node 6 can be a communication destination of the transmission node 1. In a case where the destination of the data D transmitted by the transmission node 1 is the reception node 6-$m$, the reception node 6-$m$ receives the data D from the receiver 5-$m$. Accordingly, the connection combination of the receiver 5-$m$ is also the connection combination of the reception node 6-$m$.

An operation of the communication system 100 is now described. The transmission node 1 transmits data D directed to the reception node 6-$d$ (d being an integer of 1 to $n^k$). The signal separation unit 2 separates the data D into the signal G1, the signal G2, . . . , and the signal Gk. The signal separation unit 2 outputs the signal Gi (i being an integer of 1 to k) to the $1 \times n$ switch 32-$i$ of the switch 3.

The control unit 35 of the switch 3 receives a control signal from an external device. The switch 3 reads the control signal, and obtains information about the reception node 6-$d$ as the destination of the data D or the receiver 5-$d$ connected to the destination reception node 6-$d$. The control unit 35 controls the switch unit 31 so that each 1×n switch 32-*i* outputs the signal Gi to the $n^{k-1}$ branch splitter 4-*i*-*j*ᵢ included in the connection combination of the reception node 6-*d* or the receiver 5-*d* (*j*ᵢ being an integer of 1 to n). Note that the connection combination may be set in the control signal. In this case, the control unit 35 controls the switch unit 31 to output the signal Gi to the $n^{k-1}$ branch splitter 4-*i*-*j*ᵢ included in the connection combination set in the control signal.

The 1×n switch 32-*i* receives the signal Gi the signal separation unit 2 has output, and outputs the received signal Gi from the *j*ᵢth output port designated by the control unit 35. The $n^{k-1}$ branch splitter 4-*i*-*j*ᵢ splits the signal Gi input from the 1×n switch 32-*i* into $n^{k-1}$ signals, and outputs the split signal Gi. The receiver 5-*d* that has received all of the signals G1 to Gk outputs the data D including the received signals G1 to Gk to the reception node 6-*d*. The receivers 5 other than the receiver 5-*d* that has received all of the signals G1 to Gk discard the received signals.

As in the above example, k=2, n=2, and the connection combination of the reception node 6-1 is (1, 1). In a case where the destination is the reception node 6-1, the control unit 35 controls the switch unit 31 so that the 1×n switch 32-1 outputs the signal G1 from the first output port, and the 1×n switch 32-2 outputs the signal G2 from the first output port. The $n^{k-1}$ branch splitter 4-1-1 receives the signal G1 from the 1×n switch 32-1, and the $n^{k-1}$ branch splitter 4-2-1 receives the signal G2 from the 1×n switch 32-2. The $n^{k-1}$ branch splitter 4-1-1 splits the received signal into two, and outputs the split signals to the receiver 5-1 and the receiver 5-2. The $n^{k-1}$ branch splitter 4-2-1 splits the received signal into two, and outputs the split signals to the receiver 5-1 and the receiver 5-3.

The receiver 5-1 receives the signal G1 and the signal G2, and outputs data D in which the received signal G1 and signal G2 are set, to the reception node 6-1. Since the receiver 5-2 receives the signal G1 but does not receive the signal G2, the receiver 5-2 discards the received signal G1. Since the receiver 5-3 receives the signal G2 but does not receive the signal G1, the receiver 5-3 discards the received signal G2. The receiver 5-4 receives neither the signal G1 nor the signal G2.

Note that, in a case where the number k' of signals in the data D from the transmission node 1 is less than the number k of the 1×n switches 32, the signals other than the signals G1 to Gk' included in the data transmitted by the transmission node 1 are used as signals G(k'+1) to Gk. The signals G(k'+1) to Gk may be generated by the transmission node 1, may be generated by the signal separation unit 2, may be generated by the control unit 35, or may be generated by some other device. Also, the number of receivers 5 may be smaller than $n^k$, if the connection combinations are different. Further, a transmitter that includes the switch 3 and the n×k $n^{k-1}$ branch splitters 4 may be formed, and the transmitter may further include the signal separation unit 2.

According to this embodiment, the communication system can transmit signals, while the number of devices is reduced even in a case where the number of destinations is large.

Second Embodiment

A communication system according to this embodiment transmits a signal to destinations designated by a transmission node. In the description below, differences from the first embodiment will be mainly explained.

Figure 2:
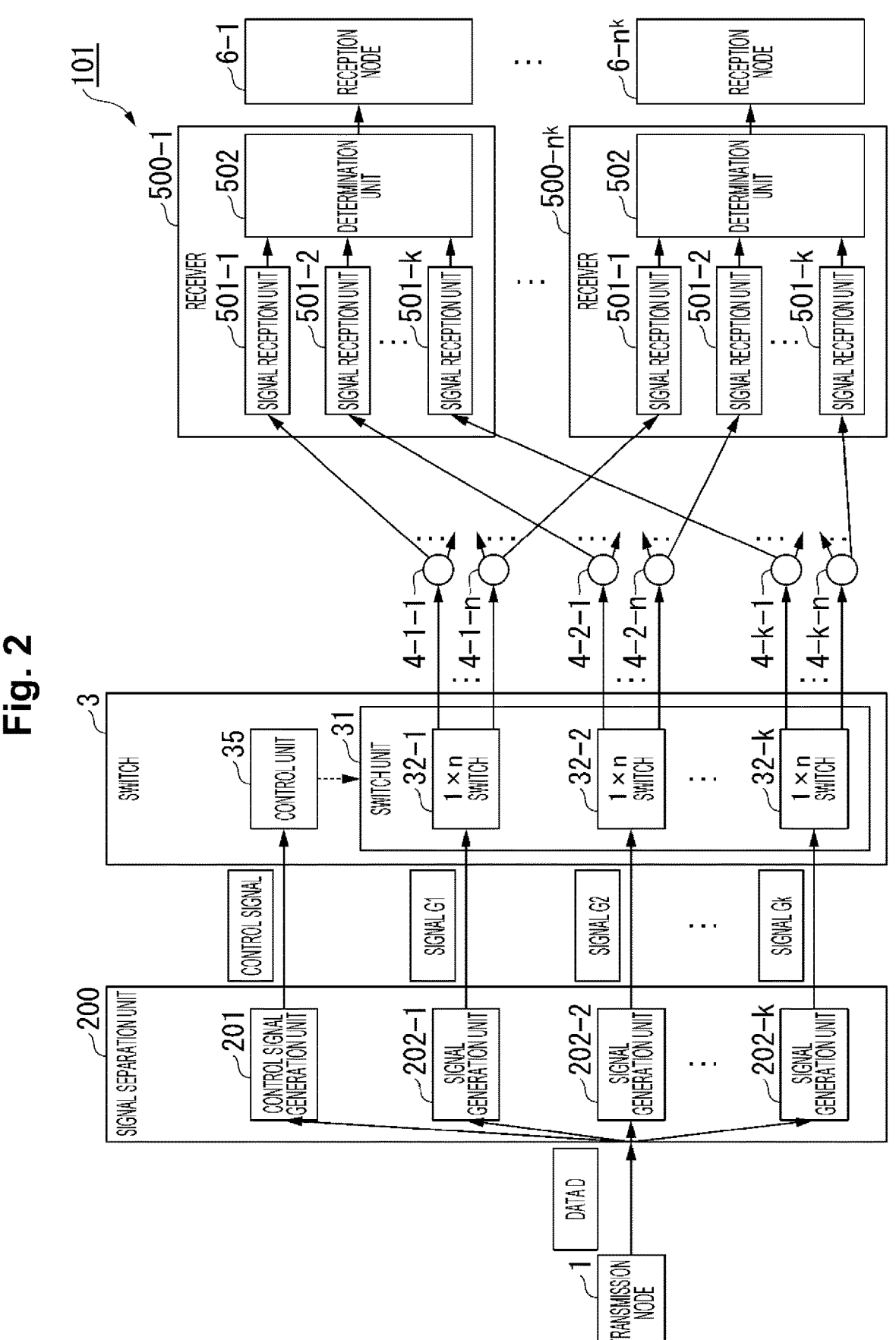
FIG. 2 is a diagram illustrating a communication system according to a second embodiment.

FIG. 2 is a configuration diagram of a communication system 101 according to a second embodiment of the present invention. In the drawing, the same components as those of the communication system 100 according to the first embodiment illustrated in FIG. 1 are denoted by the same reference numerals as those used in FIG. 1, and explanation thereof is not made herein. The communication system 101 differs from the communication system 100 illustrated in FIG. 1, in including a signal separation unit 200 in place of the signal separation unit 2, and $n^k$ receivers 500 in place of the $n^k$ receivers 5 (k and n being integers of 2 or greater). The $n^k$ receivers 500 are referred to as the receivers 500-1 to 500-$n^k$, respectively. That is, the communication system 101 includes a receiver 500-*m* in place of the receiver 5-*m* (m being an integer of 1 to $n^k$).

The signal separation unit 200 includes a control signal generation unit 201 and k signal generation units 202. The k signal generation units 202 are referred to as the signal generation units 202-1 to 202-*k*, respectively. The control signal generation unit 201 reads data D input from the transmission node 1, and extracts transmission destination information. The transmission destination information is information necessary for calculating the receiver 500 connected to the reception node 6 as the destination of the data D, or the reception node 6 as the destination of the data D. The control signal generation unit 201 generates a control signal in which the transmission destination information is set, and outputs the control signal to the control unit 35 of the switch 3.

A signal generation unit 202 generates an appropriate signal from the data D by electrical processing. The signal generation unit 202-*i* (i being an integer of 1 to k) reads the data D input from the transmission node 1, and extracts the signal Gi from the data D. Alternatively, the signal generation unit 202-*i* extracts partial data to be transmitted with the signal Gi from the data D, and generates the signal Gi in which the extracted partial data is set. The signal generation unit 202-*i* outputs the signal Gi to the 1×n switch 32-*i* of the switch 3.

A receiver 500 includes k signal reception units 501 and a determination unit 502. The k signal reception units 501 are referred to as the signal reception units 501-1 to 501-*k*, respectively. In a case where the connection combination of the receiver 500-*m* is (*j*₁, *j*₂, . . . , *j*ₖ) (each of *j*₁, *j*₂, . . . , and *j*ₖ being an integer of 1 to n), the signal reception unit 501-*i* of the receiver 500-*m* is connected to the $n^{k-1}$ branch splitter 4-*i*-*j*ᵢ. The signal reception unit 501-*i* outputs a received signal Gi to the determination unit 502.

For simplicity, k=2, n=2, the connection combination of the receiver 500-1 is (1, 1), the connection combination of the receiver 500-2 is (1, 2), the connection combination of the receiver 500-3 is (2, 1), and the connection combination of the receiver 500-4 is (2, 2). In this case, the signal reception unit 501-1 of the receiver 500-1 is connected to the $n^{k-1}$ branch splitter 4-1-1, and the signal reception unit 501-2 is connected to the $n^{k-1}$ branch splitter 4-2-1. The signal reception unit 501-1 of the receiver 500-2 is connected to the $n^{k-1}$ branch splitter 4-1-1, and the signal reception unit 501-2 is connected to the $n^{k-1}$ branch splitter 4-2-2. The signal reception unit 501-1 of the receiver 500-3 is connected to the $n^{k-1}$ branch splitter 4-1-2, and the signal reception unit 501-2 is connected to the $n^{k-1}$ branch splitter 4-2-1. The signal reception unit 501-1 of the receiver 500-4 is connected to the $n^{k-1}$ branch splitter 4-1-2, and the signal reception unit 501-2 is connected to the $n^{k-1}$ branch splitter 4-2-2.

In a case where it is determined that signals have been received from all of the signal reception units 501-1 to 501-$k$, a determination unit 502 outputs the data D including the signals G1 to Gk to the reception node 6. In a case where it is determined that one or more of the signals G1 to Gk have not been received, on the other hand, the determination unit 502 discards the received signals. A determination unit 502 is formed with an electrical passage sensor or the like when the signals are electrical signals, and is formed with an optical signal passage sensor or the like when the signals are optical signals.

An operation of the communication system 101 is now described. The transmission node 1 transmits data D directed to the reception node 6-$d$ (d being an integer of 1 to $n^k$). The control signal generation unit 201 of the signal separation unit 200 reads destination information from the data D, and obtains transmission destination information indicating that the destination reception node 6-$d$ or the receiver 500-$d$ connected to the destination reception node 6-$d$ is the transmission destination. The control signal generation unit 201 generates a control signal in which the transmission destination information is set, and outputs the generated control signal to the control unit 35 of the switch 3. Each of the signal generation units 202-$i$ (i being an integer of 1 to k) extracts the signal Gi from the data D, and outputs the signal Gi to the 1×n switch 32-$i$ of the switch 3.

The control unit 35 of the switch 3 receives the control signal generated by the control signal generation unit 201, and reads the received control signal. By doing so, the control unit 35 recognizes, from the transmission destination information, that the transmission destination of the data D is the receiver 500-$d$ or the reception node 6-$d$. The control unit 35 controls the switch unit 31 so that each 1×n switch 32-$i$ outputs the signal Gi to the $n^{k-1}$ branch splitter 4-$i$-$j_i$ ($j_i$ being an integer of 1 to n) included in the connection combination of receiver 5-$d$ or the reception node 6-$d$. The 1×n switch 32-$i$ receives the signal Gi the signal generation unit 202-$i$ has output, and outputs the received signal Gi from the $j_i$th output port designated by the control unit 35. The $n^{k-1}$ branch splitter 4-$i$-$j_i$ splits the signal Gi input from the 1×n switch 32 into $n^{k-1}$ signals, and outputs the split signal Gi.

The signal reception unit 501-$i$ of the receiver 500-$d$ receives the signal Gi output from the $n^{k-1}$ branch splitter 4-$i$-$j_1$, and outputs the received signal Gi to the determination unit 502. The determination unit 502 of the receiver 500-$d$ determines that all of the signal reception units 501-1 to 501-$k$ have received signals, and outputs the data D including the signals G1 to Gk to the reception node 6-$d$. The determination units 502 of the receivers 500 other than the receiver 500-$d$ determine that one or more signal reception units 501 of the signal reception units 501-1 to 501-$k$ have not received any signal, and discards the received signals.

For example, k=2, n=2, and the connection combination of the reception node 6-1 is (1, 1), as in the example described above. In a case where the destination is the reception node 6-1, under the control of the control unit 35, the 1×n switch 32-1 outputs the signal G1 from the first output port, and the 1×n switch 32-2 outputs the signal G2 from the first output port. The $n^{k-1}$ branch splitter 4-1-1 receives the signal G1 from the 1×n switch 32-1, and the $n^{k-1}$ branch splitter 4-2-1 receives the signal G2 from the 1×n switch 32-2. The $n^{k-1}$ branch splitter 4-1-1 splits the received signal into two, and outputs the split signals to the receiver 500-1 and the receiver 500-2. The $n^{k-1}$ branch splitter 4-2-1 splits the received signal into two, and outputs the split signals to the receiver 500-1 and the receiver 500-3.

In the receiver 500-1, the signal reception unit 501-1 receives the signal G1 from the $n^{k-1}$ branch splitter 4-1-1, and the signal reception unit 501-2 receives the signal G2 from the $n^{k-1}$ branch splitter 4-2-1. The determination unit 502 of the receiver 500-1 determines that all of the signal reception unit 501-1 and the signal reception unit 501-2 have received signals, and outputs data D in which the received signals G1 and G2 are set to the reception node 6-1.

In the receiver 500-2, the signal reception unit 501-1 receives the signal G1 from the $n^{k-1}$ branch splitter 4-1-1, but the signal reception unit 501-2 does not receive the signal G2. Since the signal reception unit 501-2 does not receive the signal, the determination unit 502 of the receiver 500-2 discards the signal G1. In the receiver 500-3, the signal reception unit 501-2 receives the signal G2 from the $n^{k-1}$ branch splitter 4-2-1, but the signal reception unit 501-1 does not receive the signal. Since the signal reception unit 501-1 does not receive the signal, the determination unit 502 of the receiver 500-3 discards the signal G2. The signal reception unit 501-1 and the signal reception unit 501-2 of the receiver 500-4 do not receive any signal.

According to this embodiment, the communication system can transmit signals, while the number of devices is reduced even in a case where the number of destinations is large. Also, data can be transmitted to a reception node of a destination designated by the transmission node.

Third Embodiment

A communication system of this embodiment reduces the device size of a receiver. In the description below, differences from the second embodiment will be mainly described, but the differences from the second embodiment may be applied to the first embodiment.

Figure 3:
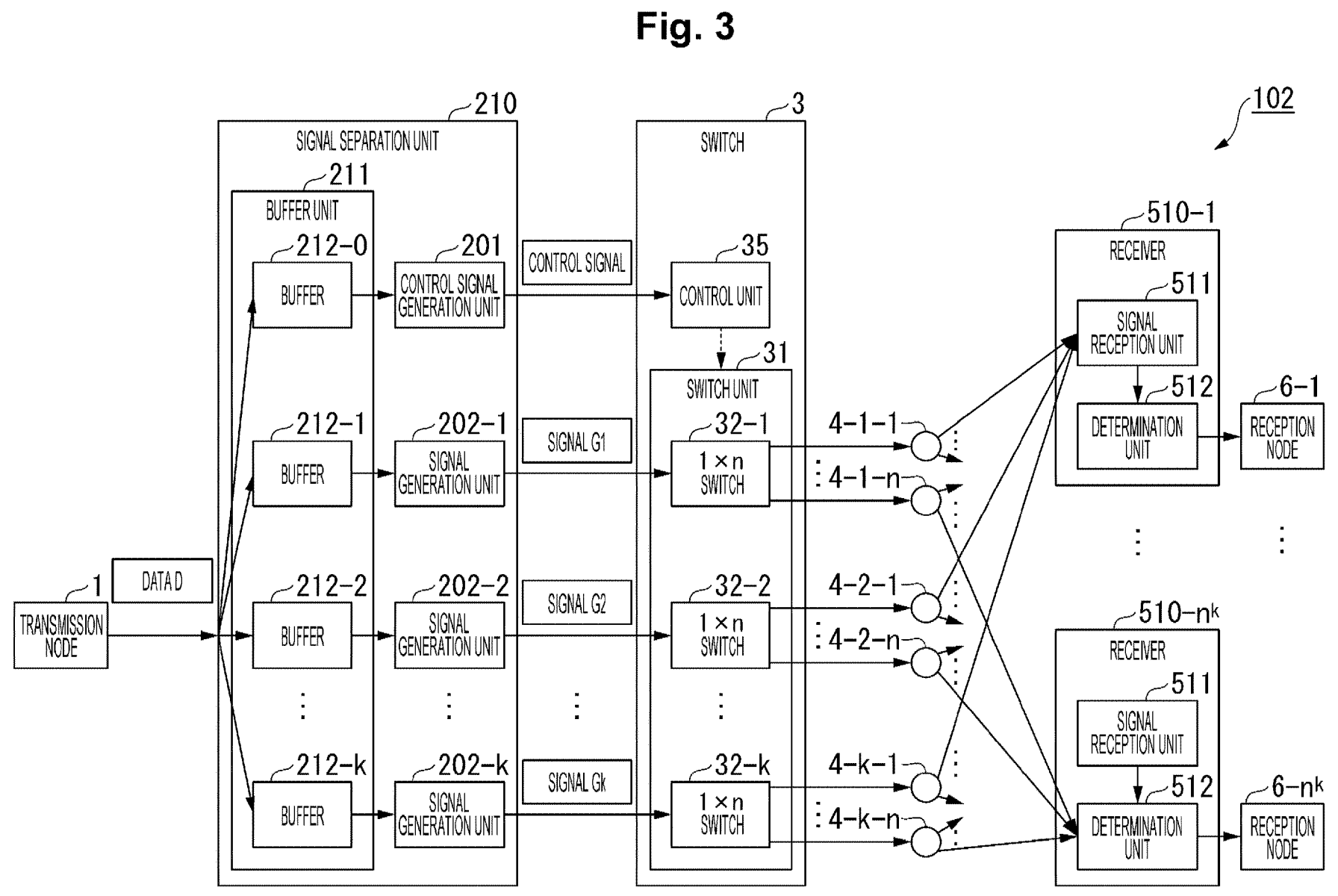

FIG. 3 is a configuration diagram of a communication system 102 according to a third embodiment of the present invention. In the drawing, the same components as those of the communication system 101 according to the second embodiment illustrated in FIG. 2 are denoted by the same reference numerals as those used in FIG. 2, and explanation thereof is not made herein. The communication system 102 differs from the communication system 101 illustrated in FIG. 2, in including a signal separation unit 210 in place of the signal separation unit 200, and $n^k$ receivers 510 in place of the $n^k$ receivers 500 (k and n being integers of 2 or greater). The $n^k$ receivers 510 are referred to as the receivers 510-1 to 510-$n^k$, respectively. That is, the communication system 102 includes a receiver 510-$m$ in place of the receiver 500-$m$ (m being an integer of 1 to $n^k$).

The signal separation unit 210 includes a buffer unit 211, a control signal generation unit 201, and signal generation units 202-1 to 202-$k$. The buffer unit 211 includes k+1 buffers 212. The k+1 buffers 212 are referred to as the buffers 212-0 to 212-$k$. The output destination of the buffer 212-0 is the control signal generation unit 201, and the output destination of a buffer 212-$i$ (i being an integer of 1 to k) is the signal generation unit 202-$i$. The buffers 212-0 to 212-$k$ have different buffer times from one another. Here, the buffer time of the buffer 212-0 is shorter than the buffer time of any of the buffers 212-1 to 212-$k$. A buffer 212 stores the data D input from the transmission node 1, and outputs the stored data D when the buffer time has elapsed. As a result, the control signal and the signals G1 to Gk are output to the switch 3 at different timings in a time division manner.

A receiver 510 includes a signal reception unit 511 and a determination unit 512. In a case where the connection combination of the receiver 510-$m$ is ($j_1$, $j_2$, . . . , $j_k$), the signal reception unit 511 of the receiver 510-$m$ is connected to the $n^{k-1}$ branch splitter 4-1-$j_1$, the $n^{k-1}$ branch splitter 4-2-$j_2$, . . . , and the $n^{k-1}$ branch splitter 4-$k$-$j_k$ (each of $j_1$, $j_2$, . . . , and $j_k$ being an integer of 1 to n). The signal reception unit 511 outputs the signals G received from the $n^{k-1}$ branch splitter 4 to the determination unit 512.

For simplicity, k=2, n=2, the connection combination of the receiver 510-1 is (1, 1), the connection combination of the receiver 510-2 is (1, 2), the connection combination of the receiver 510-3 is (2, 1), and the connection combination of the receiver 510-4 is (2, 2). In this case, the signal reception unit 511 of the receiver 510-1 is connected to the $n^{k-1}$ branch splitter 4-1-1 and the $n^{k-1}$ branch splitter 4-2-1, the signal reception unit 511 of the receiver 510-2 is connected to the $n^{k-1}$ branch splitter 4-1-1 and the $n^{k-1}$ branch splitter 4-2-2, the signal reception unit 511 of the receiver 510-3 is connected to the $n^{k-1}$ branch splitter 4-1-2 and the $n^{k-1}$ branch splitter 4-2-1, and the signal reception unit 511 of the receiver 510-4 is connected to the $n^{k-1}$ branch splitter 4-1-2 and the $n^{k-1}$ branch splitter 4-2-2.

In a case where it is determined that all the signals G1 to Gk have been received from the signal reception unit 511, the determination unit 512 outputs data D including the signals G1 to Gn to the reception node 6. In a case where only some of the signals G1 to Gk have been received, on the other hand, the determination unit 512 discards the received signals. The determination unit 512 is formed with an electrical signal or optical signal passage sensor, and a counter. The determination unit 512 accepts the data D only when signals have passed k times. Note that the start timing and the end timing of the period for determining whether signals have passed k times are set in the determination unit 512 in advance, or are synchronized with the transmission node 1, the signal separation unit 210, or the control unit 35.

An operation of the communication system 102 is now described. The transmission node 1 transmits data D directed to the reception node 6-$d$ (d being an integer of 1 to $n^k$). The buffer unit 211 of the signal separation unit 210 writes the data D into the buffers 212-0 to 212-$k$. The buffer times of the buffers 212-0 to 212-$k$ are $t_0$ to $t_k$, respectively. Here, $t_0$ to $t_k$ are different values. Further, to is shorter than $t_1$ to $t_k$.

The buffer 212-0 outputs the data D to the control signal generation unit 201 at the timing when the buffer time to has elapsed since the data D was written. The control signal generation unit 201 reads destination information from the data D, and obtains transmission destination information. The control signal generation unit 201 generates a control signal in which the transmission destination information is set, and outputs the generated control signal to the control unit 35 of the switch 3. The control unit 35 of the switch 3 receives the control signal transmitted by the signal separation unit 210, and reads the received control signal. By doing so, the control unit 35 recognizes, from the transmission destination information, that the transmission destination of the data D is the receiver 5-$d$ or the reception node 6-$d$. The control unit 35 controls the switch unit 31 so that each 1×n switch 32-$i$ (i being an integer of 1 to k) outputs the signal Gi to the $n^{k-1}$ branch splitter 4-$i$-$j_i$ ($j_i$ being an integer of 1 to n) included in the connection combination of receiver 5-$d$ or the reception node 6-$d$.

The buffer 212-$i$ outputs the stored data D at the timing when the buffer time $t_i$ has elapsed since the data D was written. The buffer 212-$i$ outputs the data D to the signal generation unit 202-$i$ at the timing $t_i$. The signal generation unit 202-$i$ extracts the signal Gi from the data D, and outputs the signal Gi to the 1×n switch 32-$i$ of the switch 3. The 1×n switch 32-$i$ receives the signal Gi the signal generation unit 202-$i$ has output, and outputs the received signal Gi from the $j_i$th output port designated by the control unit 35. The $n^{k-1}$ branch splitter 4-$i$-$j_i$ splits the signal Gi input from the 1×n switch 32 into $n^{k-1}$ signals, and outputs the split signal Gi. The signals G1 to Gk are transmitted in a time division manner so as not to overlap each other in terms of timing.

In a case where a connected $n^{k-1}$ branch splitter 4-$i$-$j$ has output the signal Gi, the signal reception unit 511 of a receiver 510 receives the signal Gi and outputs the received signal Gi to the determination unit 512. The determination unit 512 of the receiver 510-$d$ receives all the signals G1 to Gk at different timings, and outputs the data D including the signals G1 to Gk to the reception node 6-$d$. The determination units 512 of the receivers 5 other than the receiver 5-$d$ determine that one or more of the signals G1 to Gk have not been received, and discard the received signals.

According to this embodiment, the communication system can transmit signals, while the number of devices is reduced even in a case where the number of destinations is large. Also, a receiver is only required to include one signal reception unit, and accordingly, the receivers can be made smaller in size. Further, it is also possible to lower the costs of the receivers.

Fourth Embodiment

A communication system of this embodiment transmits optical signals. In the description below, differences from the first embodiment will be mainly described, but the differences from the first embodiment may be applied to the second and third embodiments.

Figure 4:
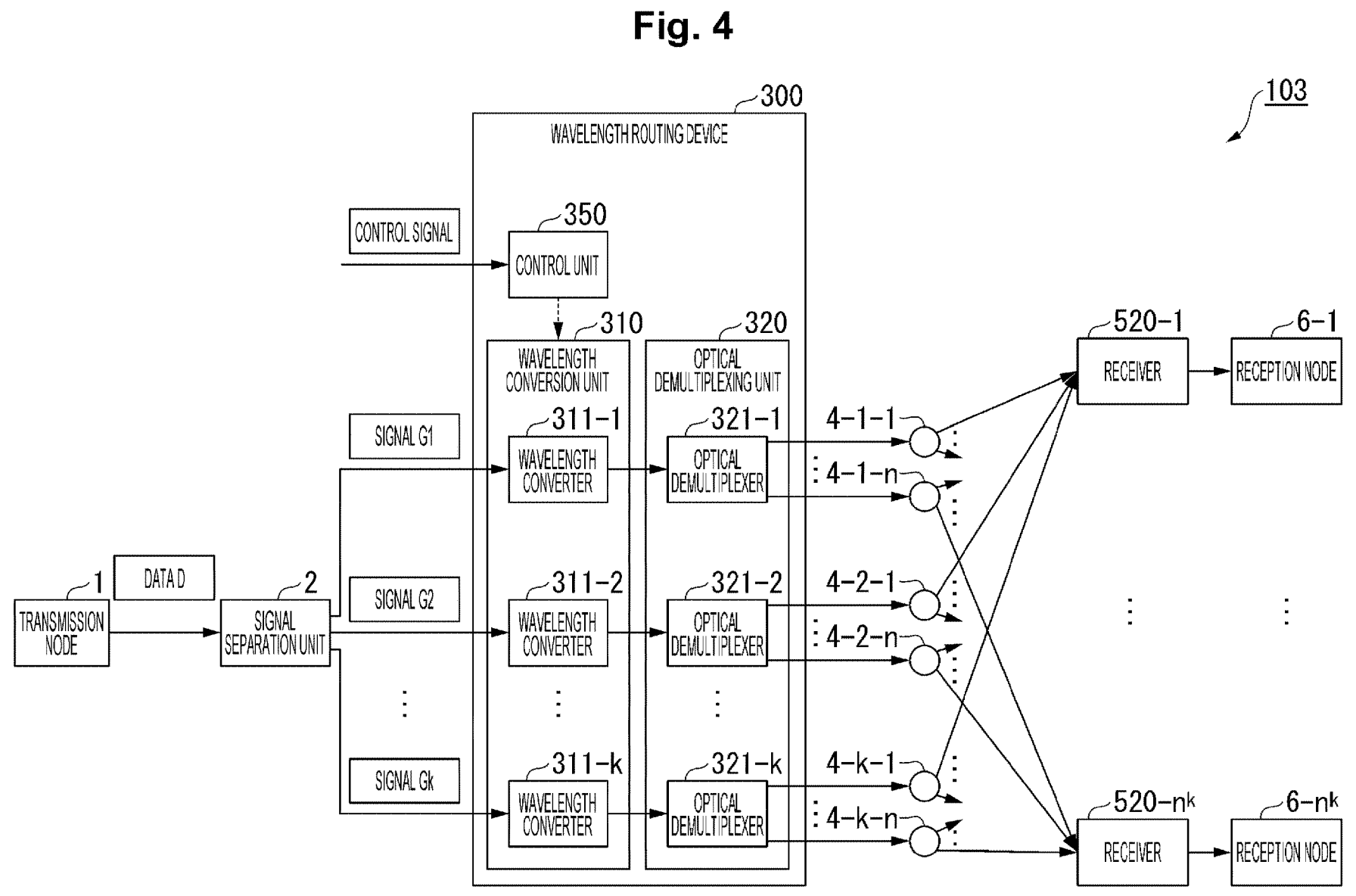

FIG. 4 is a configuration diagram of a communication system 103 according to a fourth embodiment of the present invention. In the drawing, the same components as those of the communication system 100 according to the first embodiment illustrated in FIG. 1 are denoted by the same reference numerals as those used in FIG. 1, and explanation thereof is not made herein. The communication system 103 differs from the communication system 100 illustrated in FIG. 1 in including a wavelength routing device 300 in place of the switch 3, and receivers 520 in place of the receivers 5. Note that the signals G1 to Gk to be output from the signal separation unit 2 are optical signals. The receivers 520 receive optical signals. The $n^k$ receivers 520 are referred to as the receivers 520-1 to 520-$n^k$, respectively. That is, the communication system 103 includes a receiver 520-$m$ in place of the receiver 5-$m$ (m being an integer of 1 to $n^k$).

The wavelength routing device 300 includes a wavelength conversion unit 310, an optical demultiplexing unit 320, and a control unit 350. As described in Reference Literature 1, the wavelength routing device 300 is a combination of optical multiplexers/demultiplexers such as arrayed waveguide gratings (AWGs) and wavelength converters such as semiconductor optical amplifiers (SOAs).

(Reference Literature 1): Knowledge Base, "Group 9 (Electronic Materials and Devices), 6th Edition (Passive and Functional Devices), Chapter 10: Optical Signal Processing Devices", Institute of Electronics, Information and Communication Engineers, Internet <URL: http://www.ieice-hbk-b.org/files/09/09gun_06hen_10.pdf>

The wavelength conversion unit 310 converts the wavelengths of the respective signals G1 to Gk. The wavelength conversion unit 310 includes k wavelength converters 311. The k wavelength converters 311 are referred to as the wavelength converters 311-1 to 311-$k$, respectively. In accordance with an instruction from the control unit 350, a wavelength converter 311-$i$ (i being an integer of 1 to k)

converts the wavelength of the signal Gi input from the signal separation unit 2 into a wavelength compatible with the destination of the data D.

The optical demultiplexing unit 320 includes k optical demultiplexers 321. An optical demultiplexer 321 has one input port and n output ports. The n output ports are compatible with light of different wavelengths from one another. The k optical demultiplexers 321 are referred to as the optical demultiplexers 321-1 to 321-$k$, respectively. An optical demultiplexer 321-$i$ outputs light of a wavelength $\lambda_{ij}$ from the jth (j being an integer of 1 to n) output port. The jth output port of the optical demultiplexer 321-$i$ is connected to the $n^{k-1}$ branch splitter 4-$i$-$j$. The optical demultiplexer 321-$i$ receives the signal Gi output from the wavelength converter 311-$i$ through the input port, and outputs the signal Gi from the output port compatible with the wavelength $\lambda_{ij}$ of the signal Gi among the n output ports. Note that the wavelengths $\lambda_{11}$ to $\lambda_{kn}$ are different wavelengths, but some of them may be the same wavelength.

The control unit 350 inputs a control signal, and obtains, from the control signal, information about the reception node 6 as the destination of the data D, or the receiver 5 connected to the destination reception node 6. The control unit 350 controls the wavelength converters 311-1 to 311-$k$ so that the receiver 5 connected to the destination reception node 6 receives the signals G1 to Gk. That is, the control unit 350 instructs the wavelength converter 311-$i$ about the wavelength Ail after conversion of the signal Gi, so that the optical demultiplexer 321-$i$ outputs the signal Gi to the $n^{k-1}$ branch splitter 4-$i$-$j$ included in the connection combination of the destination reception node 6 or the receiver 5 connected to the destination reception node 6.

The receivers 520 receive optical signals. The connection combinations of the receivers 520-1 to 520-$m$ are different from one another. In a case where all of the signals G1 to Gk have been received, the receivers 520 accept the data D including the received signals G1 to Gk. In a case where the receiver 520-$m$ (m being an integer of 1 to $n^k$) has accepted the data D, the accepted data D is output to the reception node 6-$m$. In a case where only some of the signals G1 to Gk have been received, on the other hand, the receivers 520 discard the received signals.

An operation of the communication system 103 is now described. For simplicity, k=2, n=2, and the signal destination is the reception node 6-1. Further, the connection combination of the receiver 520-1 is (1, 1), the connection combination of the receiver 520-2 is (1, 2), the connection combination of the receiver 520-3 is (2, 1), and the connection combination of the receiver 520-4 is (2, 2).

The transmission node 1 transmits data D directed to the reception node 6-$d$ (d being an integer of 1 to $n^k$). The data D is separated into the signal G1, the signal G2, . . . , and the signal Gk. The signal separation unit 2 outputs the signal Gi (i being an integer of 1 to k) to the wavelength converter 311-$i$ of the wavelength routing device 300.

The control unit 350 of the wavelength routing device 300 receives a control signal, and reads the received control signal. By doing so, the control unit 350 recognizes, from the transmission destination information, that the transmission destination of the data D is the receiver 520-$d$ or the reception node 6-$d$. The control unit 350 instructs the wavelength converters 311-1 to 311-$k$ about wavelengths so that each of the $n^{k-1}$ branch splitters 4-1-$j_1$ to 4-$k$-$j_k$ indicated by the connection combination of the receiver 520-$d$ or the reception node 6-$d$ transmits a signal.

Here, the destination is the receiver 520-1 as mentioned above, the connection combination is (1, 1). The control unit 350 instructs the wavelength converter 311-1 about the wavelength $\lambda_{11}$, and instructs the wavelength converter 311-2 about the wavelength $\lambda_{21}$. The wavelength converter 311-1 converts the wavelength of the signal G1 into $\lambda_{21}$ and outputs the signal G1 to the optical demultiplexer 321-1, and the wavelength converter 311-2 converts the wavelength of the signal G2 into $\lambda_{21}$ and outputs the signal G2 to the optical demultiplexer 321-1. The optical demultiplexer 321-1 outputs the signal G1 of the wavelength $\lambda_{11}$ from the first port to the $n^{k-1}$ branch splitter 4-1-1, and the optical demultiplexer 321-2 outputs the signal G2 of the wavelength $\lambda_{21}$ from the first port to the $n^{k-1}$ branch splitter 4-2-1. The $n^{k-1}$ branch splitter 4-1-1 splits the received signal into two, and outputs the split signals to the receiver 520-1 and the receiver 520-2. The $n^{k-1}$ branch splitter 4-2-1 splits the received signal into two, and outputs the split signals to the receiver 520-1 and the receiver 520-3.

In the receiver 520-1 receives the signal G1 from the $n^{k-1}$ branch splitter 4-1-1, and receives the signal G2 from the $n^{k-1}$ branch splitter 4-2-1. The receiver 520-1 outputs the data D in which the received signal G1 and signal G2 are set, to the reception node 6-1. Since the receiver 520-2 receives the signal G1 but does not receive the signal G2, the receiver 520-2 discards the received signal G1. Since the receiver 520-3 receives the signal G2 but does not receive the signal G1, the receiver 520-3 discards the received signal G2. The receiver 520-4 receives neither the signal G1 nor the signal G2.

Figure 5:
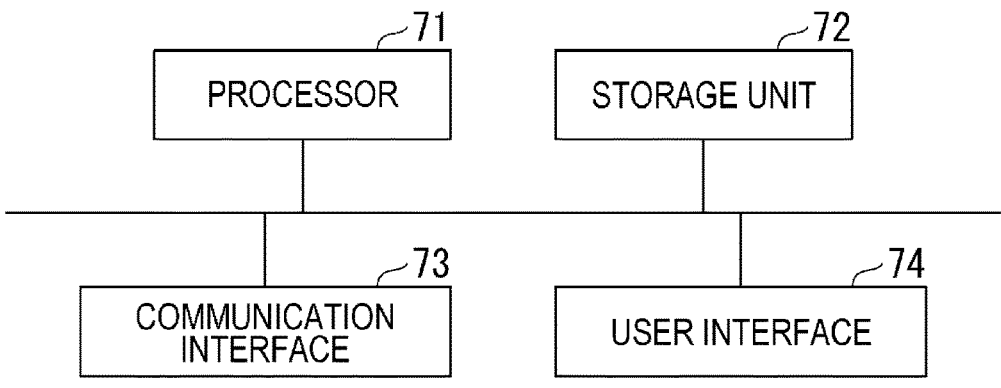
FIG. 5 is a diagram illustrating a hardware configuration of a control unit according to the first to fourth embodiments.
Figure 6:
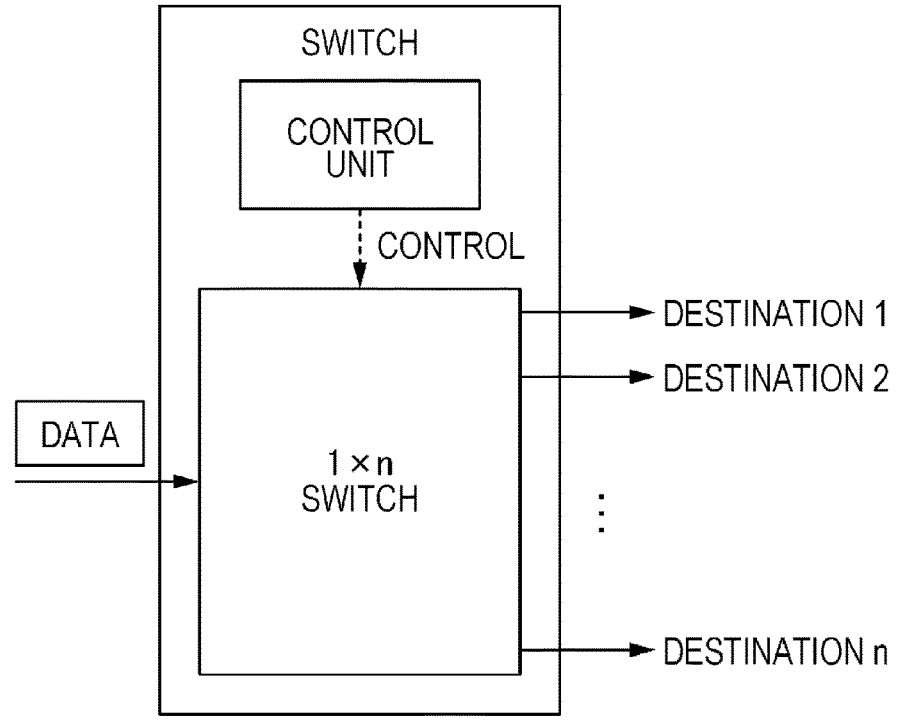
FIG. 6 is a diagram illustrating an example of a conventional switch.
Figure 7:
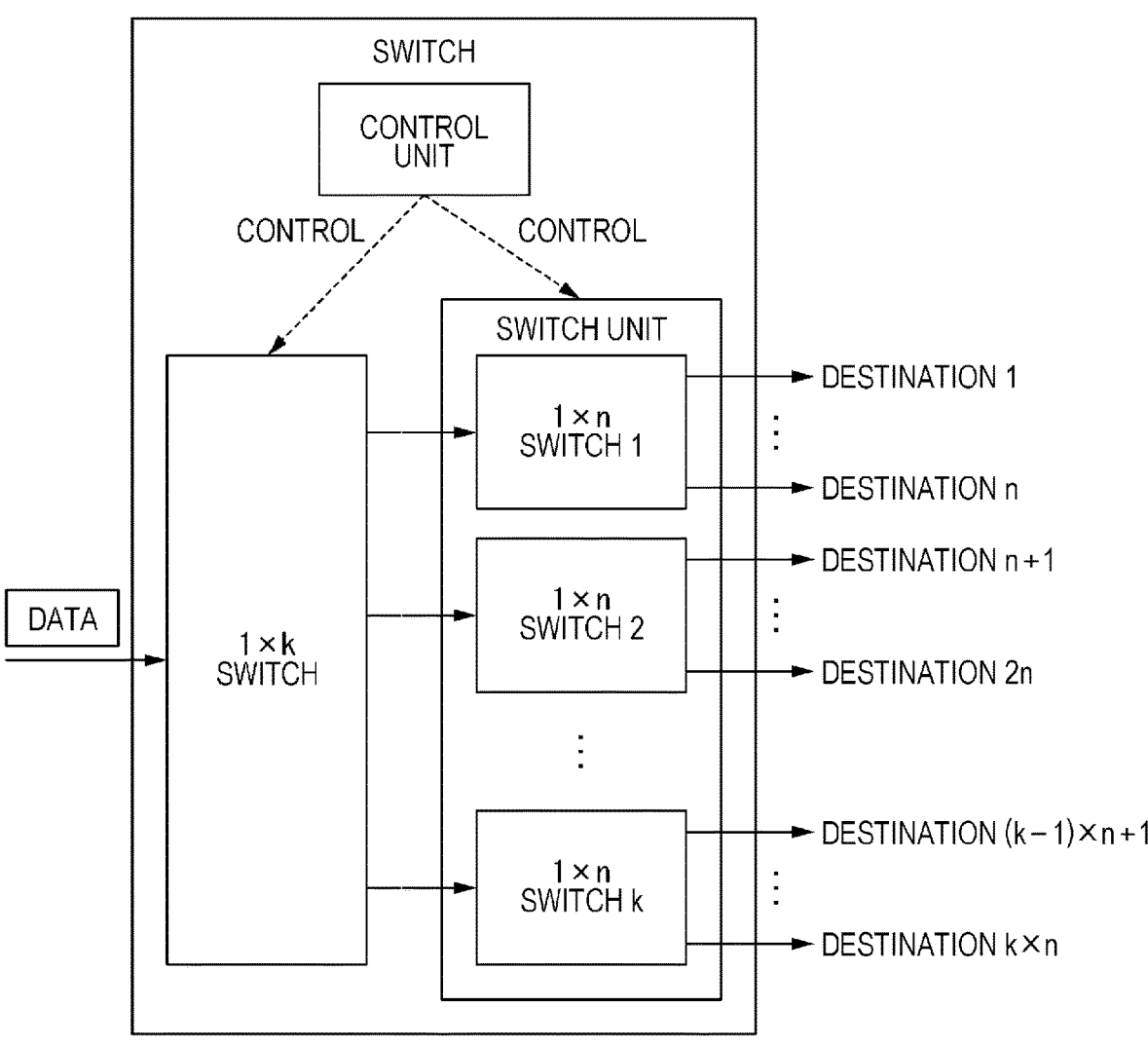
FIG. 7 is a diagram illustrating an example of a conventional switch.

FIG. 5 is a diagram illustrating an example hardware configuration of the control unit 35 and the control unit 350. The control unit 35 and the control unit 350 include a processor 71, a storage unit 72, a communication interface 73, and a user interface 74. The processor 71 is a central processing device that performs calculation and control. The processor 71 is a central processing unit (CPU), for example. The processor 71 reads a program from the storage unit 72, and executes the program. The storage unit 72 further includes a work area and the like for the processor 71 to execute various kinds of programs. The communication interface 73 is communicably connected to another device. The user interface 74 is an input device such as buttons, a keyboard, or a pointing device, and a display device such as lamps or a display. Artificial operations are input through the user interface 74.

All or some of the functions of the control unit 35 and the control unit 350 are implemented by the processor 71 reading a program from the storage unit 72 and executing the program. Note that all or some of these functions may be implemented with the use of hardware such as an application specific integrated circuit (ASIC), a programmable logic device (PLD), or a field programmable gate array (FPGA).

According to this embodiment, even in a case where the number of destinations is large, the communication system can transmit optical signals to the destinations, using a smaller number of devices than in conventional cases.

According to the embodiments described above, a communication system includes k (k being an integer greater than or equal to) switching units, n×k splitter units each corresponding to respective one of n (n being an integer greater than or equal to) output ports of the k switching units, a plurality of receivers, and a control unit. Each of the k switching units receives a signal, and outputs the signal to one of the n output ports. For example, the switching units are the 1×n switches 32 of the embodiments. Each of the n×k splitter units splits the signal having been output from the corresponding output port into $n^{k-1}$ signals. For example, the splitter units are the $n^{k-1}$ branch splitters 4 of the embodiments. The plurality of receivers are connected to the k splitter units that split signals having been output from the k respective switching units. The combinations of k splitter units connected to the plurality of receivers are different from one another. A receiver accepts received signals when receiving signals from all of the connected k splitter units, but discards received at least one signal when receiving the at least one signal from only a part of the connected k splitter units. The control unit controls the output ports of the k switching units to output signals in accordance with which one of the receivers is the destination.

The communication system may further include a signal separation unit. The signal separation unit separates data into a plurality of signals, and outputs the plurality of separated signals to different switching units. The signal separation unit may extract, from the data, information from which the destination can be acquired, and output the extracted information to the control unit. The signal separation unit may also output the plurality of separated signals to different switching units at different timings.

In a case where signals are optical signals, the switching units are optical demultiplexers, and the communication system further includes an optical wavelength conversion unit. An optical demultiplexer outputs the received signal from an output port corresponding to the wavelength of the received signal among the n output ports. The wavelength conversion unit converts the wavelengths of k signals, and outputs the k signals having the converted wavelengths to different optical demultiplexers. The control unit controls the wavelength conversion unit to convert the wavelength of each of the k optical signals in accordance with which receiver out of the plurality of receivers is the destination.

Note that a transmitter may include k switching units, n×k splitter units, and a control unit. Also, the transmitter may further include a signal separation unit.

Although embodiments of the present invention have been described in detail with reference to the drawings so far, specific configurations are not limited to these embodiments, and include designs and the like without departing from the spirit of the present invention.

REFERENCE SIGNS LIST 1 transmission node
2 signal separation unit
3 switch
4-1-1 to 4-$k$-$n$ $n^{k-1}$ branch splitter
5-1 to 5-$n^k$ receiver
6-1 to 6-$n^k$ reception node
31 switch unit
32-1 to 32-$k$ 1×n switch
35 control unit
71 processor
72 storage unit
73 communication interface
74 user interface
100 communication system
101 communication system
102 communication system
103 communication system
200 signal separation unit
201 control signal generation unit
202-1 to 202-$k$ signal generation unit
210 signal separation unit
211 buffer unit
212-0 to 212-$k$ buffer
300 wavelength routing device 310 wavelength conversion unit
311-1 to 311-$k$ wavelength converter
320 optical demultiplexing unit
321-1 to 321-$k$ optical demultiplexer
350 control unit
500-1 to 500-$n^k$ receiver
501-1 to 501-$k$ signal reception unit
502 determination unit
510-1 to 510-$n^k$ receiver
511 signal reception unit
512 determination unit
520-1 to 520-$n^k$ receiver

The invention claimed is:

1. A communication system comprising:
k (k being an integer greater than or equal to 2) switches each receiving a signal, and outputting the signal to one of n (n being an integer greater than or equal to 2) output ports;
n×k splitters each corresponding to respective one of the n output ports of the k switches, and splitting the signal having been output from the respective one of the output ports into $n^{k-1}$ signals;
a plurality of receivers each connected to k splitters out of the n×k splitters that split the signal having been output from respective one of the k switches, wherein each of the receivers accepts received signals when having received the signals from all of the connected k splitters, and discards at least one of the received signals when having received at least one signal from a part of the connected k splitters; and
a controller that controls one of the output ports of the k switches to output the signal in accordance with which receiver out of the plurality of receivers is a destination, the plurality of receivers being connected to different combinations of the k splitters from each other.

2. The communication system according to claim 1, further comprising
a signal separator that separates data into a plurality of signals, and outputs the plurality of separated signals to different ones of the k switches.

3. The communication system according to claim 2, wherein
the signal separator extracts, from the data, information from which the destination can be acquired, and outputs the extracted information to the controller.

4. The communication system according to claim 2, wherein
the signal separator outputs the plurality of separated signals to different ones of the k switches at different timings.

5. The communication system according to claim 1, wherein
the signal is an optical signal,
the k switches are optical demultiplexers that output the received signal from one of the n output ports, the one of the n output ports corresponding to a wavelength of the signal among the n output ports,
the communication system further comprises a wavelength converter that converts the wavelengths of k signals, and outputs the k signals having the wavelengths converted, to different ones of the optical demultiplexers, and
the controller controls the wavelength converter to convert each of the wavelengths of the k optical signals in accordance with which receiver out of the plurality of receivers is the destination.

6. A transmitter comprising:

k (k being an integer greater than or equal to 2) switches each receiving a signal, and outputting the signal to one of n (n being an integer greater than or equal to 2) output ports;

n×k splitters each corresponding to respective one of the n output ports of the k switches, and splitting the signal having been output from the respective one of the output ports into $n^{k-1}$ signals; and a controller that controls one of the output ports of the k switches to output the signal in accordance with which receiver out of a plurality of receivers is a destination, each of the plurality of receivers being connected to k splitters out of the n×k splitters that split the signals having been output from the k respective switches and the plurality of receivers being connected to different combinations of the k splitters.

7. A receiver that is connected to k (k being an integer greater than or equal to 2) splitters out of n×k splitters corresponding to respective one of n (n being an integer greater than or equal to 2) output ports of k switches each receiving a signal and outputting the signal to one of the n output ports, the n×k splitters splitting the signal having been output from the respective one of the output ports into $n^{k-1}$ signals, the receiver being connected to the k splitters out of the n×k splitters that split the signal having been output from the k respective switches, the receiver comprising a signal receiver that accepts received signals when having received the signals from all of the connected k splitters, and discards at least one of the received signal when having received at least one signal from a part of the connected k splitters, wherein a combination of the k splitters connected to the receiver is different from a combination of the k splitters connected to another receiver.

8. A communication method comprising:

receiving, by each of k (k being an integer greater than or equal to 2) switches, a signal, and outputting the signal to one of n (n being an integer greater than or equal to 2) output ports;

splitting, by n×k splitters each corresponding to respective one of the n output ports of the k switches, the signal having been output from the respective one of the corresponding output ports into $n^{k-1}$ signals;

executing, by a plurality of receivers each connected to k splitters which split the signals having been output from respective one of the k switches in different combinations of the k splitters from each other, a procedure to accept received signals when having received the signals from all of the connected k splitters, and a procedure to discard at least one of the received signal when having received at least one signal from a part of the connected k splitters; and controlling one of the output ports of the k switches to output the signal in accordance with which receiver out of the plurality of receivers is a destination.

* * * * *